United States Patent Office 3,224,346
Patented Dec. 21, 1965

3,224,346
TERRAZZO REPAIR PROCESS
Anthony J. Simonson, Yardley, and David H. Packer, Levittown, Pa., assignors to Thiokol Chemical Corporation, Bristol, Pa.
No Drawing. Filed Mar. 31, 1961, Ser. No. 110,838
13 Claims. (Cl. 94—22)

This invention relates to a novel process for the repair of voids and areas of delamination between cured concrete or terrazzo installation surfaces and cured concrete subsurfaces. Further, this invention relates to the use of novel terrazzo repair compositions to repair such voids and areas of delamination. These repair compositions harden or cure with little or no (less than 15%) shrinkage to form a relatively incompressible solid in the repaired areas and in so doing rebond the adjacent and surrounding inner surfaces of the repaired areas to one another.

In the laying of concrete and terrazzo installations directly onto cured concrete subsurfaces, void spaces will occasionally occur at the interface. Further, during the process of the cure of the topping installation or subsequent thereto, delamination may occur between the subsurface and the topping so as to also produce voids at the interface. These voids are unusual in that although they may be quite extensive in area, they are usually of only an extremely shallow depth that is, of from a few thousandths to a few hundredths of an inch. Their presence is undesirable for with time and a continued exposure to traffic and thermal or other stresses, a fragmentation, rupture or further delamination of the concrete or terrazzo topping will occur. Thus impaired, these faulty surfaces would be unsuited to the load bearing purposes for which they were intended.

Prior to the present invention, the only practical method known to the art for repairing such void areas or spaces was to rip out those areas of topping that covered void spaces or which had become delaminated and to replace them with newly bonded concrete or terrazzo topping installations. Where such repair was made by this prior art procedure it was often difficult, if not impossible, to match exactly the repaired portions of the topping with the unrepaired portions with regard to color and texture. Further, this replacement process was a relatively costly one. Also, during the process of replacement, and for a minimum of 72 hours thereafter, the repaired surfaces had to be closed to traffic and other use to permit the newly laid concrete or terrazzo topping to cure to the extent of producing a serviceable, load bearing surface. Still further, no assurance would be had even after repair that the repaired portions also would not contain voids or areas of delamination.

It would therefore be of benefit to provide a method for the repair of such voids and delaminations wherein a replacement of the original topping is not necessary. This would obviate the problem of having to match colors and textures of large areas of surfacing and would also avoid the further presence of voids occurring in the newly repaired areas. Further, if the method sought could provide such repair in much shorter intervals than is required by the replacement method, then the surfaces could be opened to traffic and other uses in a similarly shorter time, and thereby minimize the inconveniences imposed by such a closing of the surfaces to traffic. This is of particular utility on much traveled flooring, e.g. in public buildings. Still further, if the method sought were substantially less costly than the replacement method, financial barriers would be lessened which tend, especially where budgetary considerations prevail, to prolong the period between when such faults are recognized and when remedial repairs are undertaken. The interval between recognition and repair would then be concomitantly shortened.

Several methods have been reported for the filling of void spaces beneath concrete surfacing. In general, the voids filled by these prior art processes must be far larger in volume and of much greater depth than those encountered in the present problem in order for the prior art procedures to have any utility. The surfacing which is to be repaired by these reported methods rests on, but is not firmly bonded to, fill materials that may be earth, clay, aggregate or some similar substance. These subsurfaces are considerably more porous and compressible than the concrete subsurfaces encountered in the present problem. The void filling compositions used in these prior art procedures are not bonding compositions in the sense of providing a durable lamination between the load bearing surfaces and their subsurfaces as is required in bonding a concrete or terrazzo surface to a concrete subsurface. The filling compositions that are used in the prior art repair processes function, in general, more as mere physical support for the concrete surfaces by reason of their compressive strength alone. It may be considered that these filling compositions therefore have the same function as the relatively loose fill subsurfaces that they replace. The voids, for the filling of which the prior art filling procedures were designed, usually occur due to natural erosion as by water, or to a settlement of the relatively loose, porous and compressible fill subsurfaces as they become more packed with time and the passage of traffic thereon. According to the prior art methods, access is made to the void spaces between the concrete surface slab and the fill subsurface by drilling holes through the concrete surfacing, or by lateral entrance through the subsurface and beneath the slab. A loose fluid mixture of solids and liquids, which after filling the void will harden to lend compressive support, is usually pumped under pressure into the voids. This technique is also used to raise settled pavements to proper position under the hydraulic action of pumping a filling composition between the concrete slab surfacing and the settled fill subsurface. Here, again, the filling compositions merely lend physical support to the weight of the surface slabs. In the filling and lifting operation voids are created which are of depths far exceeding those of the present problem. The compressibility of the fill, its porous nature and the introduction of filling compositions, not to intimately bond, but merely to lend a compressive support to the surface slabs, requires that only relatively small pumping pressures be used to admit the filling compositions to the void areas. The compositions thus employed in these prior art procedures need not and do not flow into and fill all of the small crevices and interstices as is required in solution to the present problem, and, further need not and cannot laminate all surfaces with which they come into contact. Therefore, the methods reported are unsuited to use for the repair of the voids and delamination which occur between cured concrete or terrazzo and the cured concrete subsurfaces.

Therefore, it is an object of the present invention to provide a novel process and novel laminating compositions which will effect the repair of void spaces and areas of delamination between cured concrete or terrazzo surfaces and cured concrete subsurfaces whereby replacement of the faulty surfaces is made unnecessary.

It is another object of this invention to provide a process for the repair of void spaces and areas of delamination which occur between cured concrete or terrazzo surfaces and cured concrete subsurfaces whereby even minute voids or areas of delamination are repaired and the adjacent surfaces are rebonded with great adhesive strength.

It is yet another object of this invention to provide a process of repair which involves the detection of faults and their repair and rebonding whereby significant economies and convenience from the point of time and cost are provided over the terrazzo repair methods known to date.

It is a further object of this invention to provide a repair method wherein the progress of the repair may be observed during the repair process.

Further, it is an object of this invention to provide a process of repair whereby the rebonding compositions will be placed into intimate and continuous contact with all the facial surfaces to be laminated.

It is a yet further object of this invention to provide a repair process wherein only a minimal breakup of the original topping is required to effectuate the repair.

A further object of this invention is to provide improved laminating compositions which will penetrate minute voids and areas of delamination, fill them, solidify or cure to a relatively incompressible mass and in so doing effectively rebond all adjacent and surrounding surfaces with high adhesive strength.

Other objects of this invention will become evident through the following explanations and examples.

These objects are satisfied by the present invention wherein void or delaminated areas are first detected and delineated by a sound-tapping process. Then the surface of the defective area is penetrated to gain access to the void areas by a plurality of repair and weep holes of very small diameter. Liquid bonding compositions are next pumped under relatively high pressure into the voids and up into the weep holes, while the progress of the repair process is observed by the flow of the laminating composition into the weep holes and by the sound-tapping technique. The cure-hardening of the laminating compositions and the regrinding and regrouting of the top surface of the drilled areas to be planar with and to match the surrounding surfaces as to color and texture are the final steps in the repair process of the present invention.

When repair of a faulty terrazzo installation is effected using the process and compositions of the present invention, depending upon the extent of surface area to be rebonded, savings are obtained of 50 to 95% in the time and expense which ordinarily would be required by prior art terrazzo repair techniques to replace the faulty topping. Further, the cure process for compositions of the present invention permits use of the rebonded surfaces immediately upon the repair being made, as compared to a minimum delay of 24 hours for the prior art replacement processes. Further, the novel lamination repair method disclosed herein provides significant savings in the labor costs for repair over those required by the replacement method.

In the operation of the present invention, void spaces or areas of delamination are detected by observing a "hollow" sound upon tapping the surface with a hammer. The extent of the fault is determined by the tapping process and the outlines are marked with chalk or some other marking medium. Within the outlined area a plurality of holes, of ¼" to ½" in diameter, are drilled through the concrete or terrazzo surface to the fault. These holes act both as repair and weep holes and are spaced between 2" to 2' from one another depending on the size of the area to be repaired. At least two such holes are needed for each separate area to be repaired. In the repair operation, a suitable rubber or metal gasket is inserted into or over at least one hole, termed a repair hole, and the bonding compositions described below are pumped into the repair hole under pressures of about 50 to 1,000 pounds per square inch. An automotive grease gun, or some other very high pressure pumping apparatus, may conveniently be used for this purpose. Excessive pressures which may otherwise cause rupture of the topping are avoided by having the void open to the atmosphere through the plurality of holes some of which serve as "weep" holes. Still, very high pressures are required at least initially to force the bonding compositions into all of the interstices of the fault and fill them. Relatively high initial pressures are needed, because the void areas are so thin and the debris resulting from drilling the repair and weep holes tends to seal off smaller sized void areas and this debris has to be blow out first before the adhesive composition can enter the voids. The air and debris in the void areas is forced from the spaces and out through the open weep holes. Working preferably from holes at the periphery of the fault area towards its center, each hole is pumped with the laminating composition until the latter is forced up into and out of the next adjacent, or weep, hole. This weep hole then becomes the next filling hole and this process is continued until the fault is completely filled. In this manner one may also observe the extent of filling during the filling operation. The repaired surface is then tested by the sound-tapping technique so one may be assured that all of the fault is filled, especially so at the periphery. Where hollow sounds indicate the existence of unfilled voids, more filling and weep holes are drilled, filled and tested as described. The rebonded surfaces may either be opened to use immediately and the holes regrouted at a later time, or the filling and weep holes be regrouted at once. The holes are regrouted with concrete of the same formulation and color as the original surface and after cure are ground planar with the original surface.

Epoxy concrete adhesives have been known for some while. It is disclosed in the copending application, "Concrete Adhesive Compositions," filed in the name of Anthony J. Simonson, that to avoid excessive brittleness in epoxy adhesives some flexibilizing agent must be added to the compositions, e.g. liquid polysulfide resins, such as those marketed by the Thiokol Chemical Corporation under the designations LP-3, LP-33 and LP-8 and as defined by Lee et al. in their book "Epoxy Resins," page 173 (McGraw-Hill, New York, 1957). Amino-phenol type cure accelerators are effective in curing the epoxy-polysulfide concrete adhesives of the copending application, e.g. tri(dimethylamino methyl) phenol and also tri(dimethylamino methyl) phenol/dimethylamino methyl phenol mixtures. For the adhesive compositions of the present invention, although both tri(dimethylamino methyl) phenol and mixtures of tri(dimethylamino methyl) phenol/dimethylamino methyl phenol may be used, the preferred cure agent is a mixture of tri(dimethylamino methyl) phenol/dimethylamino methyl phenol in a 1:1 weight ratio. Specific aliphatic solvents, e.g. ketones such as acetone or methyl ethyl ketone, and their mixtures, and mixtures of these aliphatic solvents and smaller percentages of aromatic solvents such as toluene or xylene or their mixture are added to these compositions to prolong their pot life and make the compositions insensitive to change in pot life due to changes in the volume of adhesive prepared, and to permit effective use of the adhesives. The solvents, however, must be substantially removed before cure of the adhesive compositions through evaporation or absorption. Compositions which contain too much solvent for the operation of the present invention, that is to say more than 15% by volume, will shrink excessively upon cure as the solvent is removed, and thereby preclude their use in the resin laminating compositions of the present invention. Further, as indicated above, a moderate rate cure accelerator such as tri(dimethylamino methyl) phenol/dimethylamino methyl phenol mixtures for the epoxy-polysulfide compositions of the present invention are preferred to very fast cure accelerators such as just tri(dimethylamino methyl) phenol alone in order to extend the pot life of the compositions of the present invention.

In general, liquid epoxy resins, together with a flexibilizing additive, a cure accelerator of reduced activity and fillers are used in a two package system in the process of the present invention. Just prior to use, the two parts, one usually containing only the epoxy resin, and the other containing the cure agent, the flexibilizing agents and fillers, are blended together and then added to the pumping device. The pumping must be completed while the compositions are still fluid, that is to say, during their effective working or pot life, otherwise the repair compositions will cure within the pumping apparatus and cause mechanical difficulties.

Polysulfide/epoxy/tri(dimethylamino methyl) phenol/dimethylamino methyl phenol compositions; diamino fatty acid amide/epoxy compositions and polyamide/epoxy compositions have particular utility as the laminating adhesives in the process of the present invention. Other compositions which may be used in the present invention include polyester/peroxide compositions, coal tar or chlorinated biphenyl extender/epoxy/amine compositions and butyl glycidyl ether/epoxy/amine compositions. In general, these compositions should have a pot life of at least 40 minutes, a shrinkage on cure not exceeding 3% of the original volume of the composition where no solvent is present and where solvent is present not over 15%, and a maximum initial viscosity of about 18,000 to 20,000 cp. at 25° C.

The following examples are merely illustrative of the process of the present invention and are not intended as a limitation upon the scope thereof.

*Example 1*

Four small areas of a terrazzo topping as initially installed did not properly bond to the concrete subsurface in a hallway of an office building and void areas of about 2 to 10 mils in depth resulted. The total area involved was approximately ten square feet. The exact areas of the delamination were found and their extent determined by tapping the surface of the terrazzo with a hammer and noting where the hollow sound occurred. These areas were outlined in crayon. Within these areas a multiplicity of ⅜" diameter holes were drilled through the terrazzo to the void spaces. An average of 1 to 2 holes per square foot of the affected area were used. The holes were then blown free of drilling dust.

A laminating composition was prepared by combining and blending a two part concrete adhesive formulation. Part A contained 150 p.b.w. (parts by weight) of a liquid mercaptan-terminated polysulfide polymer sold as LP-3 by Thiokol Chemical Corporation, 12 p.b.w. of a fast cure agent, tri(dimethylamino methyl) phenol, 12 p.b.w. of a slow cure agent, dimethylamino methyl phenol and 35 p.b.w. of toluene. Part B contained 200 p.b.w. of a liquid epoxy resin having an epoxide equivalency of 185–195 which is sold as Tipox resin B by Thiokol Chemical Corporation. The liquid epoxy resin of part B was dissolved in 14 p.b.w. of toluene.

Pressure type lubricating fillings fitted with soft metal sleeves of about ⅜" in diameter were tapped snugly into each hole as it was used for the repair process. The other holes being left open to the atmosphere as weep holes.

The laminating composition was placed into a lever-type automotive gun fitted with a nozzle which matched the lubrication fittings placed in the terrazzo. From the periphery and working towards the center of each of the delaminated areas, fittings were successively tapped in place in each of the repair holes, and each repair hole was pumped with laminating composition until the bonding adhesive flowed into and out from the adjacent weep holes. The next adjacent weep hole was then made a repair hole by tapping a fitting in place and pumping the lamination composition until the next weep hole filled, and so forth until the entire area of fault was repaired. This was checked by tapping the repaired area with a hammer. Before the bonding compositions hardened the tapped lubricating fittings were removed from the terrazzo topping.

Concrete of the same formulation as that used in laying the original topping was used to fill and grout the repair and weep holes. After cure the concrete grout was ground smooth and planar with the surface of the terrazzo installation.

Continuous inspection since repair has disclosed no delamination of the repaired areas. No rupture or other deleterious effects affected the topping during or after the repair process. The repaired areas were as efficacious as the rest of the original installation in load bearing and wear properties.

*Example 2*

Void spaces of about 2–10 mils in depth occurred under the terrazzo flooring near three doors of a basement in a private home. The void areas amounted to approximately 15 sq. ft. in total area. The extent of the faults was determined by tapping the surface with a hammer and noting the hollow or solid sound produced. The areas of the faults were outlined in chalk and a plurality of repair and weep holes about ⅜" in diameter were drilled through the terrazzo to the concrete subfloor at intervals of 1–2 per sq. ft. in the chalked off area. The general repair and finishing procedures as described in Example 1 were used to repair the voids encountered here. The same laminating composition used in Example 1 was also used.

Subsequent inspections of the repaired surfaces has indicated that they are sound.

*Example 3*

A delamination of the terrazzo topping on the first floor of a university student union building occurred to the extent of about 30 sq. ft. in area and about 2–10 mils in depth. A repair of this delaminated area was effected as described in Example 1, however, a different laminating composition was used.

Part A of the repair composition contained 100 p.b.w. of a liquid flexibilizer and cure agent, a diamino-fatty acid amide sold as EM–308 by Thiokol Chemical Corporation. Part B contained 125 p.b.w. of a liquid epoxy resin having an epoxide equivalency of 179–194 modified with butyl glycidyl ether and the modified composition sold as Tipox resin A by Thiokol Chemical Corporation.

Subsequent inspections of the repaired terrazzo since the time of repair have not disclosed the presence of any faults.

*Example 4*

In the same building as referred to in Example 3, a composition flooring, commonly known as "latex-terrazzo," and prepared using a bonding technique employing a concrete composition containing Portland cement, rubber latex, marble chips and water which had been applied to a concrete subfloor had become delaminated from the concrete subsurface to form void spaces about 2–10 mils in depth and totaling some 600 sq. ft. in area.

The repair technique used was that of this invention as was described in Example 1, with the same laminating composition as that described in Example 3.

Inspection at sundry times since repair has revealed sound surfaces with no fragmentation, delamination or voids being apparent.

*Example 5*

Extensive areas of delamination occurred in a terrazzo flooring to a depth of about 2–10 mils. The laminating composition used to repair this installation was the same as that described in Example 3. The method of repair was the same as that described in Example 1, except that no pressure fittings were used. Rather, a lever-type lubrication gun was fitted with a nozzle fitting that had no stopple or back-up valve, but merely a small diameter, about 1/16" orifice. A rubber gasket, penetrated by a hole just wide enough to admit the nozzle end of the pressure gun, was placed over the repair hole. The nozzle of the pressure gun was set into the repair hole, forming a peripheral seal from the atmosphere by means of rubber basket. The repair hole was then pumped with laminating composition, the gun being held firmly seated into the hole and against the rubber gasket by a downward body pressure from the person repairing the void.

Subsequent inspections have revealed no defects in the repaired areas.

The repair compositions of the present invention may contain up to 5% by weight of fillers and up to 15% by weight of solvents. The type fillers and solvents that can be used in the present invention are disclosed in the copending applications entitled "Concrete Adhesive Compositions" and "Process for Laying Terrazzo," filed in the name of Anthony J. Simonson.

In the polyslulfide/epoxy/tri(dimethylamino methyl) phenol/dimethylamino methyl phenol repair composition the ratio of epoxy to polysulfide by weight is in the range of 1:1 to 2.5:1 and this composition also contains 8 to 15% of the cure accelerator as disclosed in the copending applications.

In the diamino fatty acid amide/epoxy and the epoxy/polyamide compositions the ratio of epoxy to amide by weight is in the range of 2:1 to 1:1.5.

In the epoxy/amine compositions the amine may be present in amounts of up to 15% by weight of the epoxy.

In the polyester/peroxide composition the peroxide may be present in amounts of 2–5% by weight of the polyester. Other curing agents can only be used which are known as polyester curing agents.

In the coal tar or chlorinated biphenyl extender/epoxy/amine compositions the extender may be present in amounts of up to 50% by weight of the total composition, the epoxy in amounts of up to 50% and the amine in amounts of up to 15%.

In the butyl glycidyl ether/epoxy/amine compositions the ether may be present in amounts of up to 25% by weight of the total composition and the amine may be present in amounts of up to 15%. The amines that can be used in the present invention are those that are known to the art for curing epoxy compounds.

We claim:

1. A process for the repair of void areas of approximately 2 to 10 mils in depth between a terrazzo floor installation and a base structure comprising detecting said void areas, drilling a plurality of spaced repair holes through the terrazzo floor into the detected void areas whereby said repair holes allow access to said void areas from the surface of said installation, forcing a cureable flexibilized epoxide resin adhesive repair composition through said repair holes and into said void areas to fill said void areas, said forcing being conducted in such a manner that at least one of said repair holes serves as weep holes while said repair composition is being forced through at least one other of said repair holes, allowing said repair composition to cure in said void areas and bond said terrazzo installation to said base structure and restoring said repair holes to approximately their original condition.

2. A process as in claim 1 in which said repair holes are approximately 3/16 to 1 inch diameter and are spaced approximately 2 inches to 2 feet apart.

3. A process as in claim 1 in which the cureable bonding repair composition is forced through said repair holes and into said void areas at a pressure of about 50 to 1,000 pounds per square inch.

4. A process as in claim 1 further comprising cleaning said repair holes and void areas of debris prior to forcing the repair composition into said void areas.

5. A process as in claim 1 in which said repair composition is an adhesive composition consisting essentially of approximately 150 parts by weight of at least one mercaptan terminated liquid polysulfide polymer, approximately 24 parts by weight of at least one curing agent, approximately 200 parts by weight of at least one epoxy resin having an epoxide equivalency of 185–195 and approximately 49 parts by weight of at least one solvent.

6. A process as in claim 5 in which said repair composition includes up to 5% by weight of a filler.

7. A process as in claim 5 in which said repair composition includes up to 15% by weight of a solvent.

8. A process as in claim 1 in which said epoxy resin has been flexibilized with a polysulfide polymer.

9. A process as in claim 8 in which said curable adhesive repair composition contains 8 to 15% by weight of a cure accelerator and said epoxy resin and said polysulfide polymer are present in a weight ratio of 1:1 to 2.5:1.

10. A process as in claim 1 in which said epoxy resin has been flexibilized with a diamino fatty acid amide.

11. A process as in claim 10 in which said curable adhesive repair composition contains said epoxy resin and said diamino fatty acid amide in a weight ratio of 2:1 to 1:1.5.

12. A process as in claim 1 in which said repair composition is an adhesive composition consisting essentially of approximately 100 parts by weight of a diamino fatty acid amide and approximately 125 parts by weight of at least one epoxy resin having an epoxide equivalency of 185–195.

13. A process as in claim 1 in which said base structure is a concrete slab.

References Cited by the Examiner

UNITED STATES PATENTS

| | | | |
|---|---|---|---|
| 2,041,266 | 5/1936 | Poulter | 94—39 |
| 2,071,758 | 2/1937 | McKay | 117—2 |
| 2,074,566 | 3/1937 | Sheils | 117—2 |
| 2,187,324 | 1/1940 | Many | 61—36 X |
| 2,286,761 | 6/1942 | Poulter | 94—39 |
| 2,653,139 | 9/1953 | Sterling. | |
| 2,718,829 | 9/1955 | Seymour | 94—6 |
| 2,934,452 | 4/1960 | Sternberg. | |

OTHER REFERENCES

Engineering News-Record, August 1943, page 75.
Roads and Streets, April 1945, pages 84, 85 and 86.
Roads and Streets, October 1945, pages 84 and 85.
Epoxy Resins by Lee et al., 1957, pages 164–182, incl., and 216, published by McGraw-Hill Book Co., New York.
Journal of the American Concrete Institute, August 1960, pages 173–182, incl.
Cementation of Bituminous-Coal-Mine Roof Strata by Maise and Oitto, published by United States Department of Interior, Bureau of Mines Report No. 5439, 1959, pages 1–25, incl.

CHARLES E. O'CONNELL, *Primary Examiner.*

JACOB L. NACKENOFF, WILLIAM I. MUSHAKE,
*Examiners.*